US006760026B2

(12) United States Patent
Li et al.

(10) Patent No.: US 6,760,026 B2
(45) Date of Patent: Jul. 6, 2004

(54) IMAGE-BASED VIRTUAL REALITY PLAYER WITH INTEGRATED 3D GRAPHICS OBJECTS

(75) Inventors: Jiang Li, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 09/754,660

(22) Filed: Jan. 2, 2001

(65) Prior Publication Data

US 2002/0113791 A1 Aug. 22, 2002

(51) Int. Cl.[7] .............................................. G06T 17/60
(52) U.S. Cl. ....................................................... 345/427
(58) Field of Search ................................ 345/418, 419, 345/426, 427

(56) References Cited

PUBLICATIONS

S. E. Chen, QuickTime VR—An Image–based Approach to Virtual Environment Navigation, Computer Graphics Proceedings, Annual Conference Series, pp. 29–38, Proc. SIGGRAPH 1995 (Los Angeles), Aug. 1995.
C.–S. Chen, Y.–P. Hung, S.–W. Shih, C.–C. Hsieh, C.–Y. Tang, C.–G. Yu and Y.–C. Cheng. Integrating 3D graphic objects into real images for augmented reality. In Proceedings of the ACM symposium on Virtual reality software and technology, 1998, pp. 1–8.

Paul Debevec, Rendering Synthetic Objects Into Real Scenes: Bridging Traditional and Image–Based Graphics With Global Illumination and High Dynamic Range Photography, SIGGRAPH 1998.

H. Y. Shum and L. W. He, Rendering with Conventric Mosaics, Computer Graphics Proceedings, Annual Conference Series, pp. 299–306, Proc. SIGGRAPH 1999(Los Angeles). Aug. 1999.

Y. Yu and J. Malik, Recovering Photometric Properties of Architectural Scenes from Photographs, ACM Computer Graphics, Proc. of SIGGRAPH 1996, pp. 207–218, 1998.

Y. Yu, P. Debevec, J. Malik and T. Hawkins, Inverse Global Illumination: Recovering Reflectance Models of Real Scenes from Photographs, ACM Computer Graphics, Proc. of SIGGRAPH 1999, pp. 215–224, 1999.

*Primary Examiner*—Cliff N. Vo
(74) *Attorney, Agent, or Firm*—Lyon & Harr, LLP; Richard T. Lyon (57) ABSTRACT

A system and process for rendering a virtual reality environment having an image-based background, which allows a viewer to move about and interact with 3D graphic objects in a virtual interaction space of the environment. This is generally accomplished by first rendering an image-based background, and separately rendering geometry-based foreground objects. The foreground objects are then integrated into the background, and a combined image is presented to the viewer.

16 Claims, 9 Drawing Sheets

IMAGE-BASED VIRTUAL REALITY PLAYER WITH INTEGRATED 3D GRAPHICS OBJECTS

BACKGROUND

1. Technical Field:

The invention is related to the rendering of a virtual reality environment for display to a viewer, and more particularly to a system and process for rendering such an environment having an image-based background and geometry-based foreground objects.

1Background Art:

Virtual reality is an attractive technology, which provides users an environment to navigate and play. This technology is often used as a platform for games, virtual tours, and virtual real estate, as well as for many other applications. Traditional virtual reality techniques are usually based on geometrical approaches where the generated scenes may consist of millions or billions of polygons. However, the geometrical modeling and rendering approach has several drawbacks. First, it is very labor-intensive to construct a synthetic scene. Second, in order to achieve a real-time performance, the complexity and rendering quality are usually limited by the rendering engine. And third, the requirement of certain accelerating hardware limits the wide application of the method.

Recently developed image-based modeling and rendering techniques [1,4] have made is possible to simulate photo-realistic environments. The advantages of image-based rendering methods are that the cost of rendering a scene is independent of the scene complexity and truly compelling photo-realism can be achieved since the images can be directly taken from the real world. One of the most popular image-based rendering software programs is Apple Computer, Incorporated's QuickTime VR [1]. QuickTime VR uses cylindrical panoramic images to compose a virtual environment, therefore providing viewers with an immersive experience that can be viewed from a fixed viewpoint. However, an ideal virtual reality environment should provide a virtual 3D space about which a viewer can "move", and some virtual objects to interact with in the space. QuickTime VR makes an attempt at providing virtual objects by presenting pop-up objects to the viewer. Essentially, pop-up objects are 3D graphic objects presented to the viewer against the photo-realistic panoramic images representing the virtual environment. Unfortunately, because the panoramas only allow a viewer to view the scene from a fixed location, the viewer has no chance to experience 3D motion through the virtual environment.

Other approaches of image-based rendering [2, 3, 5, 6] that incorporate 3D graphic objects into scenes have also been studied. However, in these methods, the image-based scenes have to be reconstructed and represented by geometrical models again. Efforts are made on recovering reflection properties of the captured objects and lighting conditions of the scene. These methods inevitably involve much more interactions and manipulation since structure from motion is always a hard problem in vision technology. Briefly, in the rendering aspect, the problem in pure geometry-based virtual reality method is that the 3D rendering engine has to take into account all the geometrical objects in the scene even if a great part of them just acts as a background. Even worse, when a viewer only wants to interact with a small number of the rendered foreground objects, the selection engine has to process all the geometrical objects in the scene anyway—therefore greatly increasing the response time.

Thus, with current image-based virtual reality methods, either the viewer's motions is restricted or the scenes have to be reconstructed via geometrical methods.

It is noted that in the preceding paragraphs, as well as in the remainder of this specification, the description refers to various individual publications identified by an alphanumeric designator contained within a pair of brackets. For example, such a reference may be identified by reciting, "reference [1]" or simply "[1]". Multiple references will be identified by a pair of brackets containing more than one designator, for example, [2, 3, 5, 6]. A listing of the publications corresponding to each designator can be found at the end of the Detailed Description section.

SUMMARY

To present invention is directed toward a novel rendering system and process which allows viewers to freely move about and interact with 3D graphic objects in a virtual environment having an image-based background, without the need to reconstruct the background using geometric models. Essentially, this is accomplished by first rendering an image-based background, and next rendering geometry-based foreground objects. The foreground objects are then integrated into the background environment.

The image-based background scene can be captured and rendered via any appropriate image-based method. However, it is preferred that the system and process described in a co-pending U.S. patent application entitled "Scene Capturing and View Rendering Based On A Longitudinally Aligned Camera Array" having Ser. No. 09/606, 857 and a filing date of Jun. 28, 2000, be employed. Essentially, this system and process entails using a collection of images captured by a longitudinally aligned camera array, which rotates along a circle. The captured images are indexed and compressed for efficient rendering of the environment, without the need for explicit geometry.

The aforementioned geometry-based foreground objects can be rendered using any appropriate geometry-based 3D rendering engine. The selected 3D rendering engine is used to integrate 3D graphic object into the background scene. The 3D graphic objects are preferably integrated into the image-based background scene via overlapping approach that involves superimposing the objects onto the background scene. Viewers can move about in a virtual space defined by the image-based background rendering program and interact with the 3D graphic objects. In the case of the preferred rendering of the background environment, the viewer can move about and interact with 3D graphic objects in a 3D cylindrical space. It is also noted that the 3D graphic objects are introduced only if they are needed to interact with the viewers. This keeps the viewer's virtual interaction space uncluttered with unnecessary objects and so significantly reduces the 3D graphic processing time.

The foregoing system and process for integrating geometry-based 3D graphic objects into an image-based background to produce a virtual reality environment has many advantages over the existing systems. For example, unlike traditional geometry-based virtual reality systems that must take into account all the geometrical objects in the scene, the 3D graphic rendering engine employed in the present invention need only deal with a small number of foreground 3D graphic objects. As indicted previously, this significantly reduces the 3D graphic processing time. In addition, there is no need for any geometrical reconstruction in rendering the background scene. This allows for the use of complex image-based background scenes. In fact, since the background scenes can be captured in any real scene, it is possible to tour or play games in very complicated scenes such as forests that are impractical to model via geometric methods. The image-based background scenes can also be made accessible through an Internet website so that others can download them and use them as backgrounds in their games or virtual tours. Furthermore, unlike existing geometry-based virtual reality systems, a viewer using the present system and process can move about in the virtual interaction space and observe the lateral and longitudinal parallaxes and lighting changes typical in a real scene. In addition, occlusions among the 3D graphic objects, as well as occlusions between 3D graphic objects and the background, can be readily portrayed.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
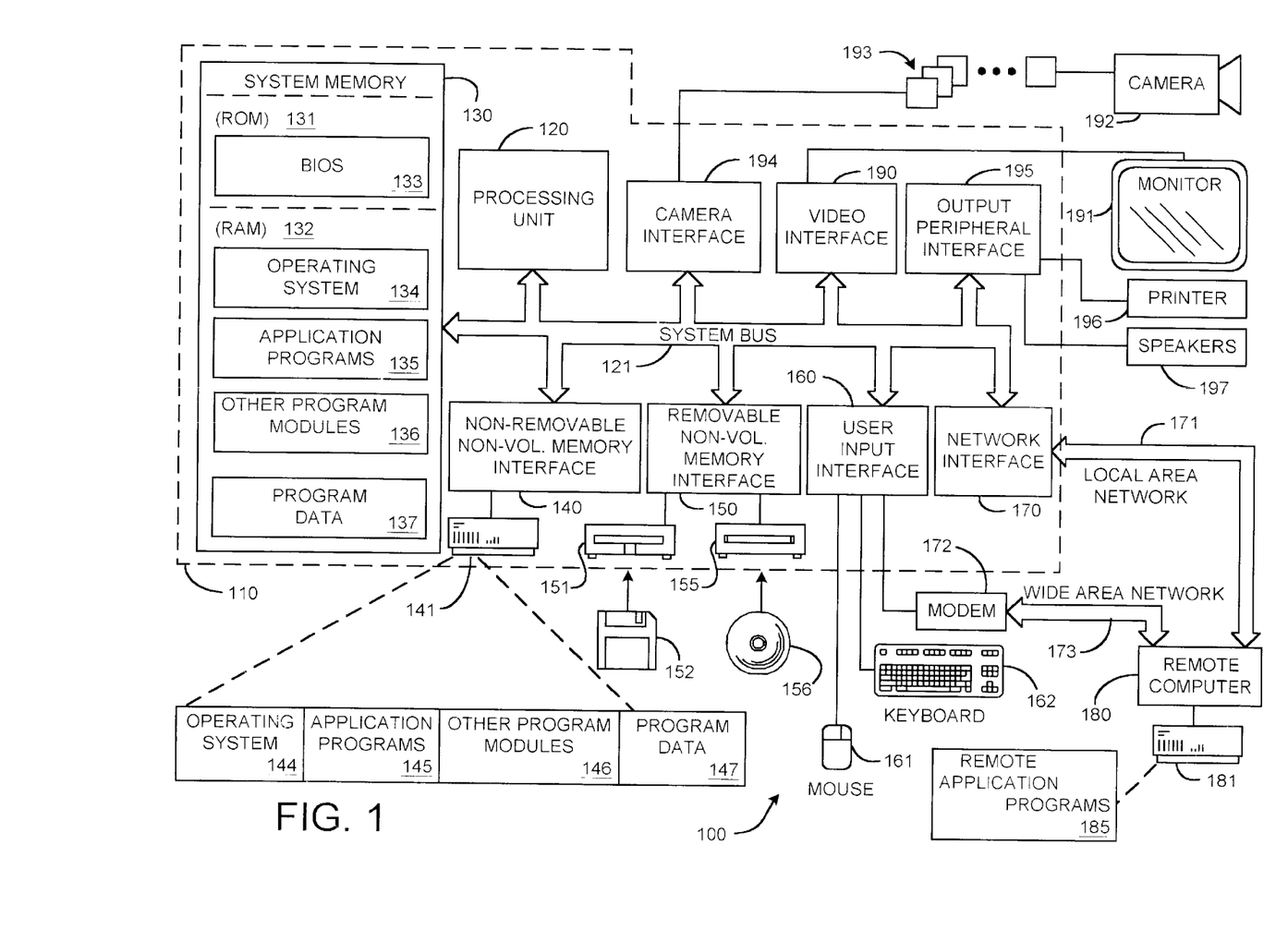
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environment, and/or configurations that may be suitable for use with the invention include, but are not limited to, personal computers, server computer, hand-held or laptop devices, multiprocessor systems, microprocessor-based systems, set top boxes, programmable consumer electronics, network PCs, minicomputers, mainframe computers, distributed computing environments that include any of the above systems or device, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way or example, and not limitation, FIG. 1 illustrates operating system 134, application programs 135, other program modules 136, and program data 137.

The computer 110 also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other network. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
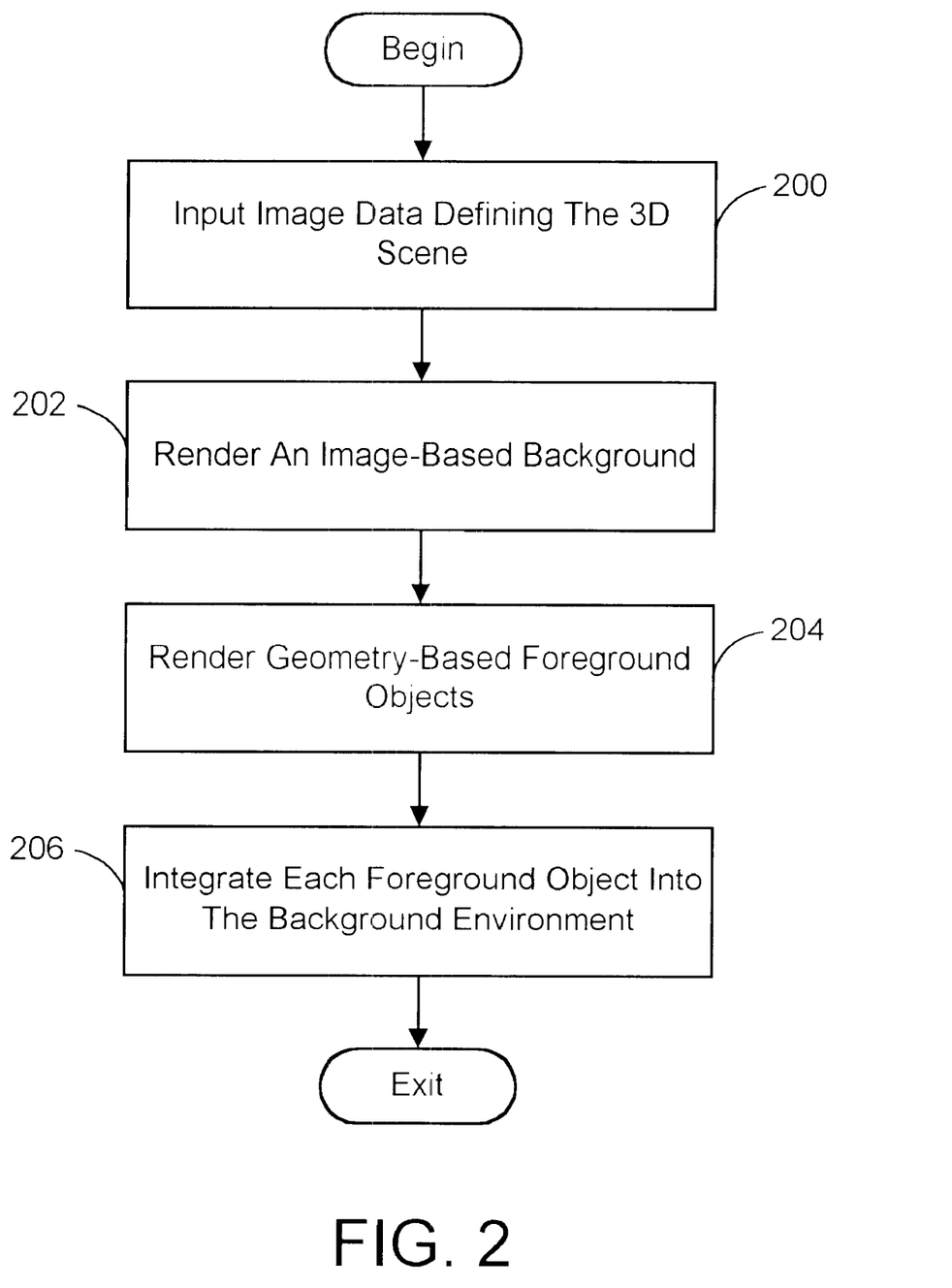
FIG. 2 is a flow chart diagramming an overall process for rendering a virtual reality environment in accordance with the present invention.

The exemplary operating environment having now been discussed, the remaining part of this description section will be devoted to a description of the program modules embodying the invention. Essentially, the system and process according to the present invention involves using a computing device to render a virtual reality environment. In general, this is accomplished via the following process actions, as shown in the high-level flow diagram of FIG. 2:

a) inputting image data defining a 3D scene (process action 200);
b) rendering an image-based background (process action 202);
c) rendering geometry-based foreground objects (process action 204); and
d) integrating each foreground object into the background environment (process action 206).

Each of these general process actions will be discussed in detail in the sections that follow.

1.0 Capturing And Rendering The Image-Based Background Scene

Figure 3:
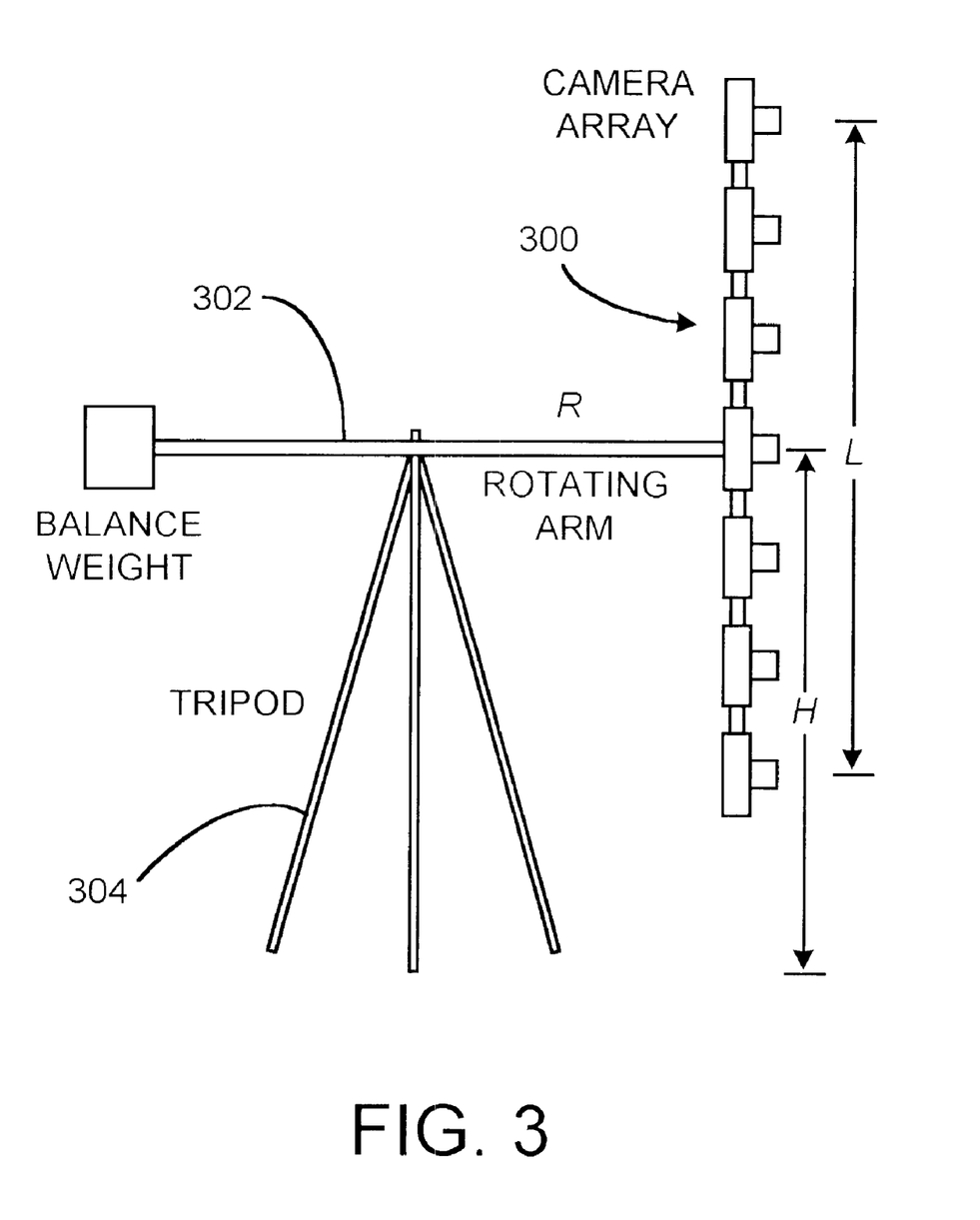
FIG. 3 is a diagram showing a side view of a simplified setup for capturing images of a 3D scene using a longitudinal camera array.
Figure 4:
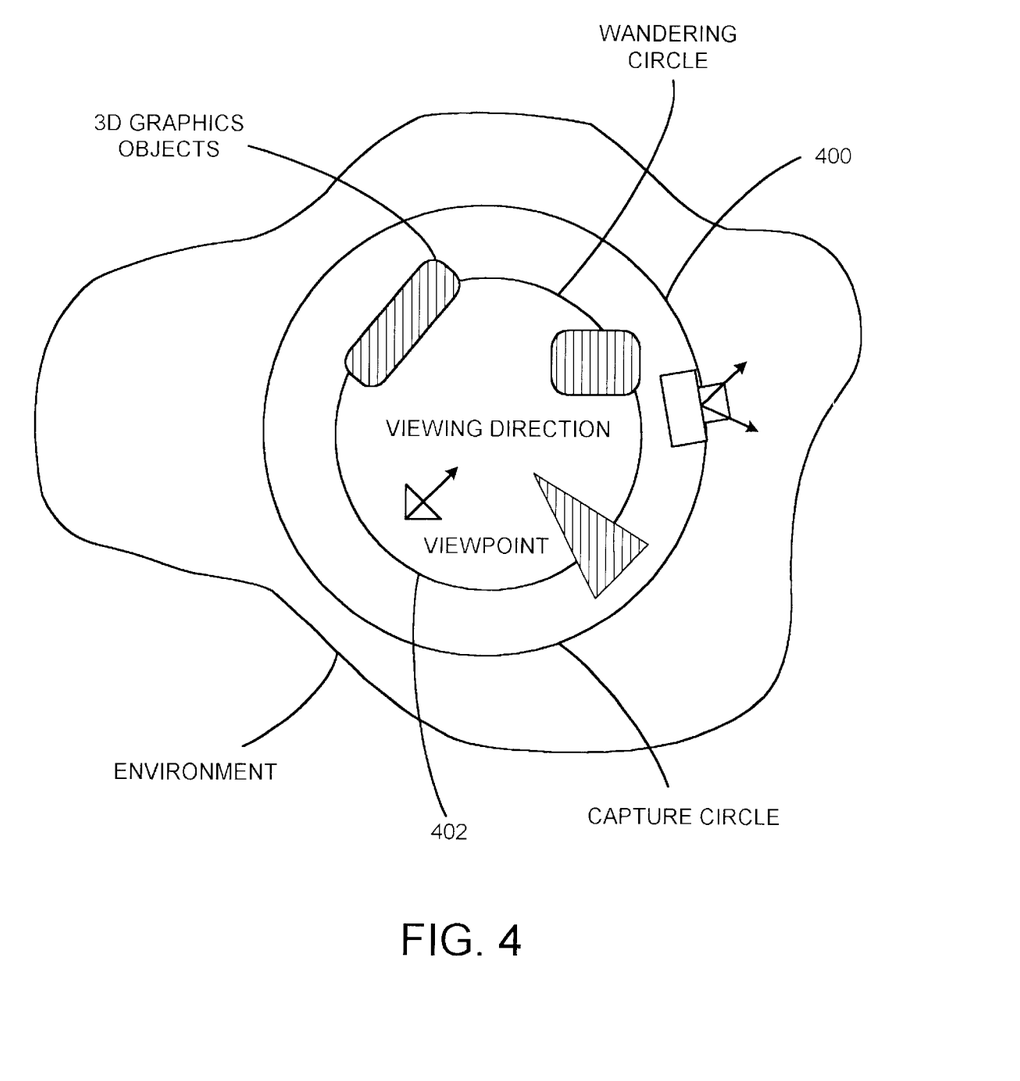
FIG. 4 is a diagram showing a top view of a virtual reality environment with various 3D graphics objects placed within the capture circle.

The image-based background scene can be captured and rendered via any appropriate image-based method. However, it is preferred that the system and process described in a co-pending U.S. patent application entitled "Scene Capturing and View Rendering Based On A Longitudinally Aligned Camera Array" having Ser. No. 09/606,857 and a filing data of June. 28, 2000, be employed. The disclosure of this co-pending application is hereby incorporated by reference. Essentially, as illustrated in FIG. 3, the background scene is captured using a longitudinally aligned camera array 300 that is mounted on a horizontal arm 302 supported by a stand 304 (which in the illustrated case is a tripod). The scene is captured while the camera array rotates along a circle, which is referred to as the "capture circle" 400, as depicted in FIG. 4. Each pixel of the captured images is indexed by 4 parameters, i.e. the rotation angle of the camera array, the longitudinal number of the camera, the image column number and the image row number. This information can be compressed using an appropriate compression technique or combination of compression techniques, such as vector quantization and/or Lempel-Ziv coding, to reduce the amount of memory space required to store it, and to facilitate its transfer in the case that it is stored remotely from the computing device that will be used to process the data. The radius R of the capture circle, the height H, and the extension L of the camera array are also recorded and stored/transferred with the rest of the aforementioned data. These latter parameters will be used to define the virtual space in which the viewer can move, and to assist in locating and sizing the 3D graphic objects that are to be placed in the virtual environment. The details of this virtual space, as well as the placement and sizing of 3D graphics objects, will be discussed later.

As indicated previously, once the captured image data is input into the present system and process, and the viewer's location and viewing direction is determined, this information is used to render the portion of the background view of the environment that the viewer would see given the current viewpoint and viewing direction, as well as the viewer's field of view. More particularly, the background is rendered as follows.

Figure 5:
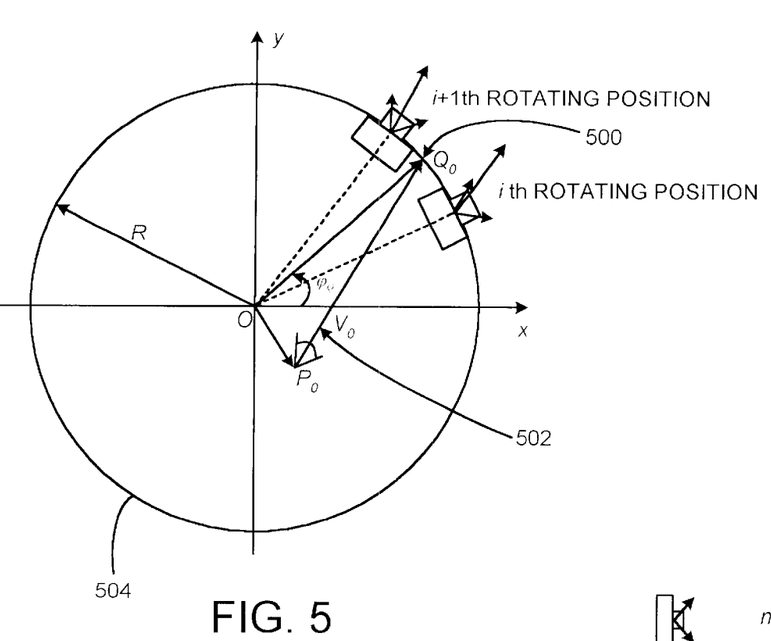
FIG. 5 is a diagram showing a top view of a capture circle and the geometric elements involved in determining the rotating position and image column number of a point at the intersection of a projection of a viewing ray and the capture circle.
Figure 6:
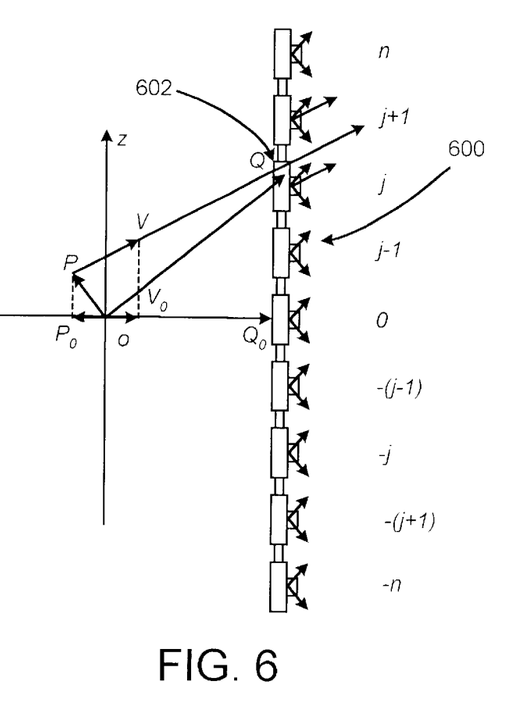
FIG. 6 is a diagram showing a side view of a capture circle and capture array showing the geometric elements involved in determining the longitudinal camera number and image row number of a point at the intersection of the viewing ray and the capture array.

Referring to FIG. 5, a viewing ray is initially determined for each pixel in the image to be rendered based on both the current viewing position and viewing direction of the viewer. For each such viewing ray, the intersection point 500 ($Q_0$) of the projection 502 ($V_0$) of the viewing ray and the capture circle 504 on the capture plane 506 is identified. This intersection point 500 indicates which image array is relevant to the viewing ray, or which two adjacent image arrays are relevant should the intersection point 500 fall between two image capture positions on the capture circle. If the intersection point 500 does fall between capture points, the image arrays associated with each capture point are identified for future interpolation. The interpolation weights for two adjacent image arrays are preferably determined according to the distances between the intersection point and the capture positions of these two image arrays. Next, based on the horizontal angle between the viewing ray and the camera direction at the intersection point, a determination is made as to which one image column in the image array(s) has a corresponding viewing direction nearest to the direction of the viewing ray. If the viewing ray falls between the viewing directions associated with two adjacent image columns, the two columns are identified for later interpolation. The interpolation weights of two adjacent image columns are preferably determined by the differences of the angles. Next, as illustrated in FIG. 6, based on the elevation angle of the viewing ray, the intersection point of the viewing ray with the longitudinal camera array 600 is calculated. This intersection point 602 (Q) indicates which camera is relevant to the viewing ray. If the intersection point 602 falls between two adjacent camera positions, the two adjacent cameras in the array 600 are identified for interpolation purposes. The interpolation weights of two adjacent cameras are determined according to the distances between the intersection point 602 and the longitudinal positions of the two cameras. Finally, according to the elevation angle of the viewing ray, a determination is made as to which pixel is to be used as the color or display value of the pixel in the rendered image. If the elevation angle falls between the elevation angles associated with two adjacent pixels of the image column, the two pixels are identified for the interpolation. The interpolation weights of the two pixels are determined by the differences of the angles. The color or display value of the pixel of the image being rendered for display to the viewer is then determined by applying all the interpolation weights applicable to the viewing ray associated with that pixel. The colors or display values associated with the pixels from the captured images that are needed to establish the color (interpolated or otherwise) of the pixel of the rendered image are retrieved from the previously-inputted image data file. The foregoing process is then repeated for each viewing ray associated with a pixel of the image being rendered.

2.0 Tracking The Viewer's Movements

As indicated earlier, one of the advantages of the present system and process for rendering a virtual reality environment is that the viewer can "move" about in the environment. This allows the viewer to view the scene from different perspectives and to interact with 3D graphic objects that have been incorporated into the environment. The details concerning the virtual space through which the viewer can move and how viewer's movements are tracked will depend on the particular image-based background rendering program employed. In the case where the previously-described preferred background rendering technique is implemented, the specifics of the virtual space and tracking procedure are as follows.

Referring once again to FIG. 4, a viewer will be allowed to "move" about within virtual space defined by a circle referred to as the "wandering circle" 402. The radius r of the wandering circle 402 depends on both the lateral field of view $\phi_{fovo}$ of the capture cameras and the radius R of the capture circle. Specifically, it equals $R\sin(\phi_{fovo}/2)$. Any ray that originates from any viewing positions within the wandering circle can always be rendered from the captured images. Thus, as long as the viewer's virtual movements are constrained within the wandering circle, the view of the surrounding scene in the viewer's filed of view can be rendered.

When a viewer first "enters" the wandering circle, the viewpoint and viewing direction (as well as the viewing scale) can be set to default parameters. The view from this default position would then be rendered and displayed to the viewer. Thereafter, the users movements would be tracked and the appropriate view rendered and displayed. Alternately, the viewer could be allowed to select the initial viewing parameters as long as they reside within the wandering circle and conform to a few other constraints that will be discussed shortly. If the viewer specifies the initial viewing parameters, these parameters are used to render the corresponding view, which is then displayed to the viewer. As with the default position option, the viewer's movements are then tracked and the appropriate views rendered and displayed with each change.

Figure 7:
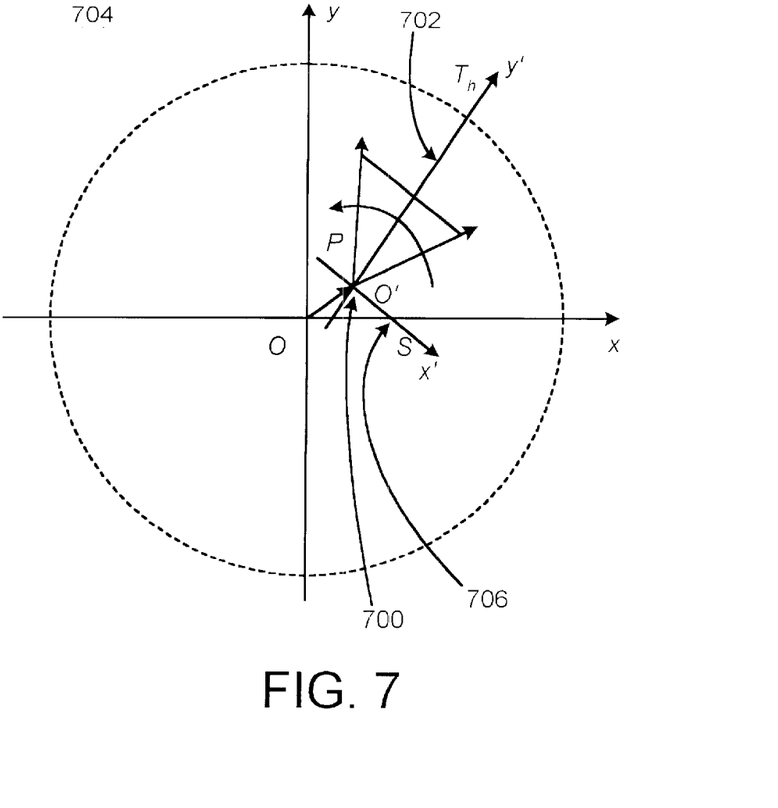
FIG. 7 is a diagram showing a top view of a wandering circle and the geometric elements involved in defining a viewer's motion within the circle.

Essentially, a viewer can move within the wandering circle by specifying a new viewing position, a new viewing direction, a new zoom level, or any combination of these changes. These movements are typically referred to as translation, rotation, and zooming, respectively. As stated above, the present preferred background rendering technique operates by detecting changes in these viewing parameters. Before describing this tracking process, a geometrical representation of user's viewing parameters will be presented to assist in the explanation of the process. As illustrated in FIG. 7, a local coordinate system of the viewer is defined by designating the current viewing position 700 (P) to be the origin O' of the coordinate system. The y' axis 702 of the local coordinate system orients along $T_h$ on the xy plane 704 of the global coordinate system. $T_h$ is the unit 3D vector along the projection of viewing direction T on the xy plane. The z' axis of the local coordinate system coincides with the z axis of the global coordinate system. The direction of the local axis x' 706 measured in the global coordinate system is denoted by S. The direction of the local axis z' (not shown) measured in the global coordinate system is denoted by U.

2.1 Translation

Assume that the viewer's translation along the local x', y' and z' axes are $\Delta x'$, $\Delta y'$ and $\Delta z'$, respectively. For the translations to the left and right, forward and backward, up and down, the new viewing positions are obtained by adding corresponding increments along S, $T_h$ and U directions respectively

2.2 Rotation

Assume that the viewer's lateral rotation is $\Delta\phi$. For the rotation to the left, T becomes, $$T_{newx} = T_x \cos(\Delta\phi) - T_y \sin(\Delta\phi) \quad (1)$$

$$T_{newy} = T_x \sin(\Delta\phi) + T_y \cos(\Delta\phi) \quad (2)$$

$T_h$ becomes, $$T_{hnewx} = T_{hx} \cos(\Delta\phi_h) - T_{hy} \sin(\Delta\phi_h) \quad (3)$$

$$T_{hnewy} = T_{hx} \sin(\Delta\phi_h) + T_{hy} \cos(\Delta\phi_h) \quad (4)$$

For rotation to the right, $\Delta\phi$ is replaced by $-\Delta\phi$ in Eqs. (1) and (2), and $\Delta\phi_h$ is replaced by $-\Delta\phi_h$ in Eqs. (3) and (4). $\Delta\phi_h$ is the projection angle of $\Delta\phi$, $$\tan(\Delta\phi_h) = \tan(\Delta\phi)/\cos(\theta) \quad (5)$$

Where $\theta$ is the elevation angle of T.

Figure 8:
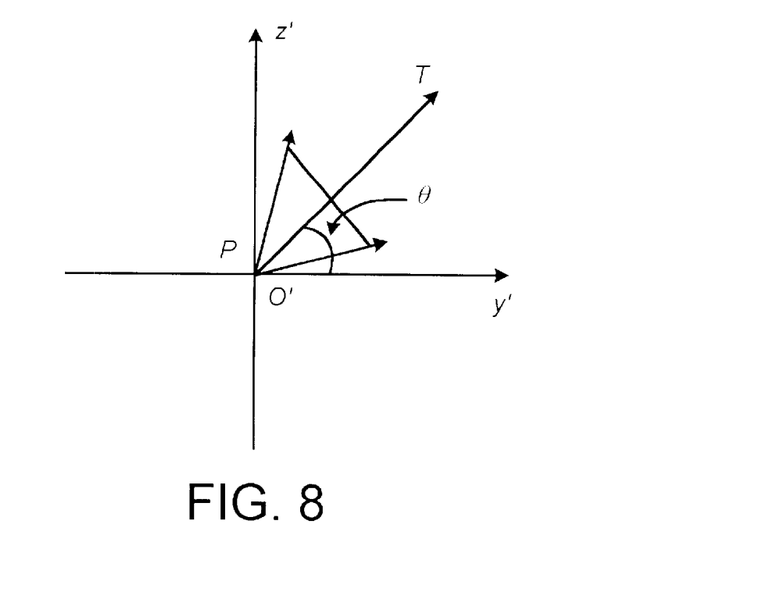
FIG. 8 is a diagram showing a side view of a wandering circle and the geometric elements involved in defining a viewer's motion above and below the circle.

As shown in FIG. 8, for longitudinal rotations, assume the viewer's longitudinal rotation around the x' axis is $\Delta\theta$. For upward rotation, the viewing direction T becomes, $$T_{newz} = T_z \cos(\Delta\theta) + \sqrt{1-T_z^2}\sin(\Delta\phi) \quad (6)$$

$$T_{newx} = T_{hx}\sqrt{1-T_{newz}^2} \quad (7)$$

$$T_{newy} = T_{hy}\sqrt{1-T_{newz}^2} \quad (8)$$

For downward rotation, the plus sign in Eq. (6) is replaced by a minus sign.

2.3 Zooming

Assume that the viewer's zooming is represented by the angular variation of the longitudinal field of view of the viewer $\Delta\phi_{fovo}$. For zooming in or out, the longitudinal field of view of the user is increased or decreased by an angle $\Delta\phi_{fovo}$ respectively.

2.4 Constraints

As mentioned previously, some additional constraints are imposed on the viewing parameters. The purpose of these additional parameters is to ensure that a view can be rendered from any viewing position, direction or zoom level from the scene data captured by the camera array. As described in the capture process above, the scene is captured by a rotating camera array. Therefore, the top and bottom areas of the cylinder have not been captured. In order to let the viewer only see the part of space that has been captured, the user's motion and viewing direction are constrained as follows. First, the viewing position P is constrained such that, $$P_x^2 + P_y^2 < r^2 \quad (9)$$

where r is the radius of the wandering circle. The z coordinate of P should obey another constraint, as described in more detail below.

The longitudinal field of view of the viewer together with the elevation angle of the viewing direction T is constrained as follows:

$$\theta + \theta_{fovo}/2 < \theta_{fovo}/2 \quad (10)$$

and $$\theta - \theta_{fovo}/2 > -\theta_{fovo}/2 \quad (11)$$

This means that the elevation angle of any viewing ray should not exceed the longitudinal field of view of the capture camera.

Another constraint is that the intersection point of the viewing ray with the capture cylinder should not exceed the extension of the camera array. With the same elevation angle, the maximum or minimum z coordinate of the intersection point must correspond to the maximum horizontal distance between the intersection point and the viewing position.

Figure 9:
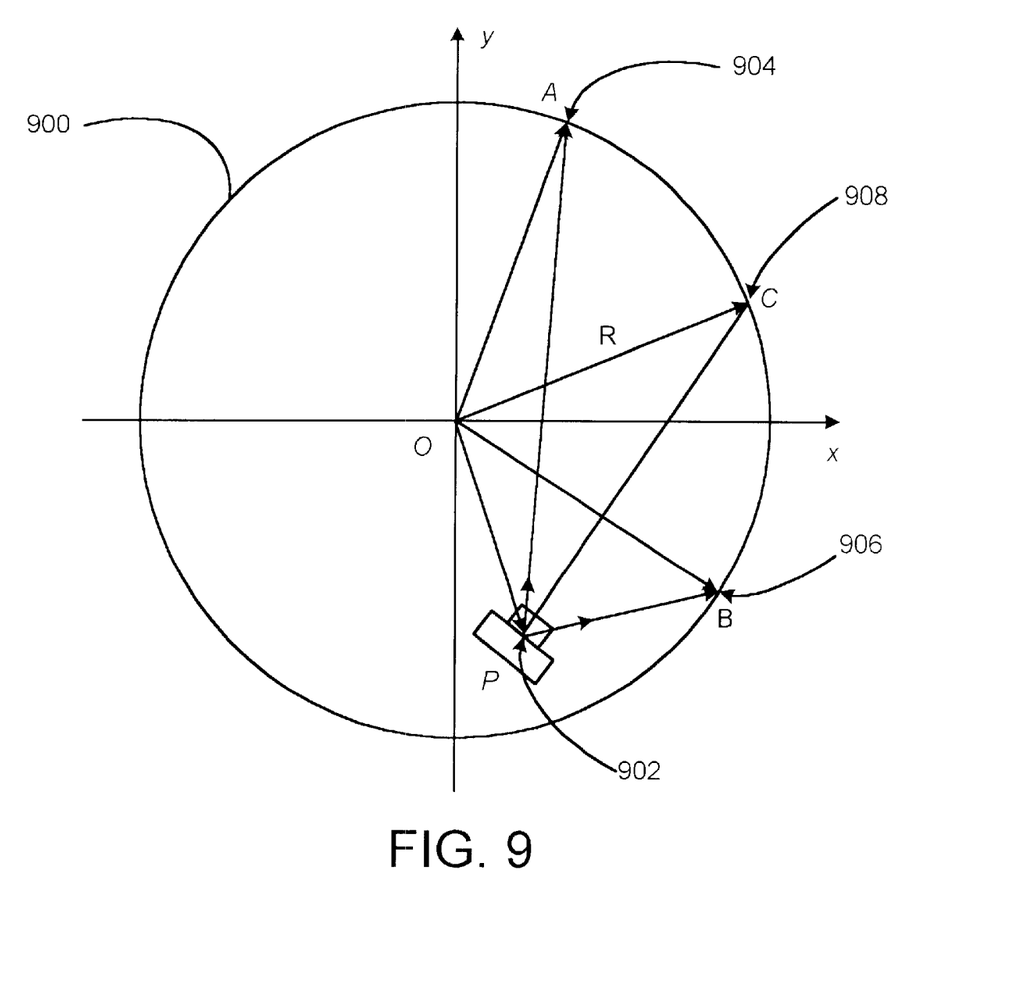
FIG. 9 is a diagram showing a top view of a capture circle and the geometric elements involved in determining the furthest point on the circle within the lateral field of view of a viewer.

As illustrated in FIG. 9, in order to find the farthest point on the capture circle 900 within the lateral field of view of the user, the left and right edges of the lateral field of the user are extended from the viewing location 902 (P). Assume that the two edges intersect with the circle at point (A) 904 and point (B) 906, respectively. Two line OA and OB are then drawn to connect point A and B with O, respectively. The distance between P and any point, assuming point (C) 908 is within the viewing image, is calculated by, $$\overline{CP}^2 = R^2 + \overline{OP}^2 - 2R\overline{OP}\cos(\angle COP). \qquad (12)$$

Since according to geometrical relationships, $$\angle BOP \leq \angle COP \leq \angle AOP \qquad (13)$$

or $$\angle AOP \leq \angle COP \leq \angle BOP, \qquad (14)$$

the farthest point on the circle within the view port should have a maximum value of ($-\cos\angle COP$).

By way of example, consider the following cases. Suppose that $\angle BOP < \angle AOP$. If $$\angle BOP \leq 180° \qquad (15)$$

the farthest point should be point B. However, if $$\angle AOP \leq 180° \text{ and } \angle BOP \geq 180° \qquad (16)$$

the farthest point should be point C with $\angle COP = 180°$. Finally, if $$\angle AOP \geq 180° \qquad (17)$$

the farthest point should be point A. $\overline{CP}$ is used to denote the longest distance.

Next, consider the intersection of a viewing ray with the capture cylinder. The top and bottom edges of the viewer's longitudinal field of view are extended. The z coordinates of the intersection points of the two edges with the cylinder are:

$$z_{top} = P_z + \overline{CP}\tan\left(\theta + \frac{\theta_{fovo}}{2}\right)\cos(\varphi_c) \qquad (18)$$

$$z_{bottom} = P_z + \overline{CP}\tan\left(\theta - \frac{\theta_{fovo}}{2}\right)\cos(\varphi_c) \qquad (19)$$

where $\phi_c$ is the angle between the projection of the line $\overline{CP}$ and the y' axis of the viewer's local coordinate system. $z_{top}$ and $z_{bottom}$ should satisfy the conditions:

$$z_{bottom} > H - L/2 \text{ and } z_{top} < H + L/2 \qquad (20)$$

3.0 Rendering 3D Graphic Objects

In one embodiment of the present system and process, 3D graphic objects are simply generated by any desired 3D rendering engine and deployed within the virtual space defined by the image-based background rendering program employed. In the example of the preferred background rendering program described previously, the generated 3D objects would be deployed within the capture circle. The viewer can then navigate through the virtual space (e.g., within the wandering circle in the exemplary case) to view an interact with the 3D graphic objects. Since the 3D objects are contained within the virtual space there is no interference with the background, and so the scene looks natural to the viewer. In essence, all that has to be provided to the 3D rendering engine are the specifics as to the location and dimensions of the virtual space, so that the 3D graphic objects can be rendered therein.

In an alternate embodiment of the present system and process, the 3D graphic objects are once again generated by any desired 3D rendering engine. However, instead of deploying the rendered objects exclusively within the virtual space, all or any portion of a rendered object can be superimposed on the background in a way that it fills an empty space in the background scene outside of the virtual space. The portion of the background filled with a 3D graphic object must be empty as any intersection of the object with an object in the background would look unnatural. For example, a table generated by the 3D rendering engine should not be superimposed on the background such that it appears to extend into a wall depicted in the background.

Granted, the viewer would not be able to directly interact with the object or portion thereof depicted outside the virtual space. However, being able to add graphic objects to the background scene is desirable. For example, in cases where a rendered object is too large to completely fit within the virtual space, or where its placement in the virtual space dictates that some part of the object extend out of the space, the portion of the object extending out of the virtual space can be superimposed onto empty portions of the background environment. The ensures the object looks natural to the viewer, rather than being truncated at the edge of the virtual space. Further, rendered objects can be placed into the background scene to enhance the viewing experience. For example, a rendered object could be superimposed such that it appears to be resting on a table depicted in the background. In this latter case where a rendered object is intended to appear to be touching some element depicted in the background, the position of the object should be checked from multiple viewpoints and adjusted as necessary so as to interface with the background in the intended manner. For example, a front view may show a rendered object resting on a table depicted in the background, whereas when viewed from a point in the virtual space off to one side, the rendered object may appear to be floating in the air in front of the table. In such a case, the depth of the object would be adjusted using the 3D rendering engine so that it appears to rest on the table from all viewpoints.

Figure 10:
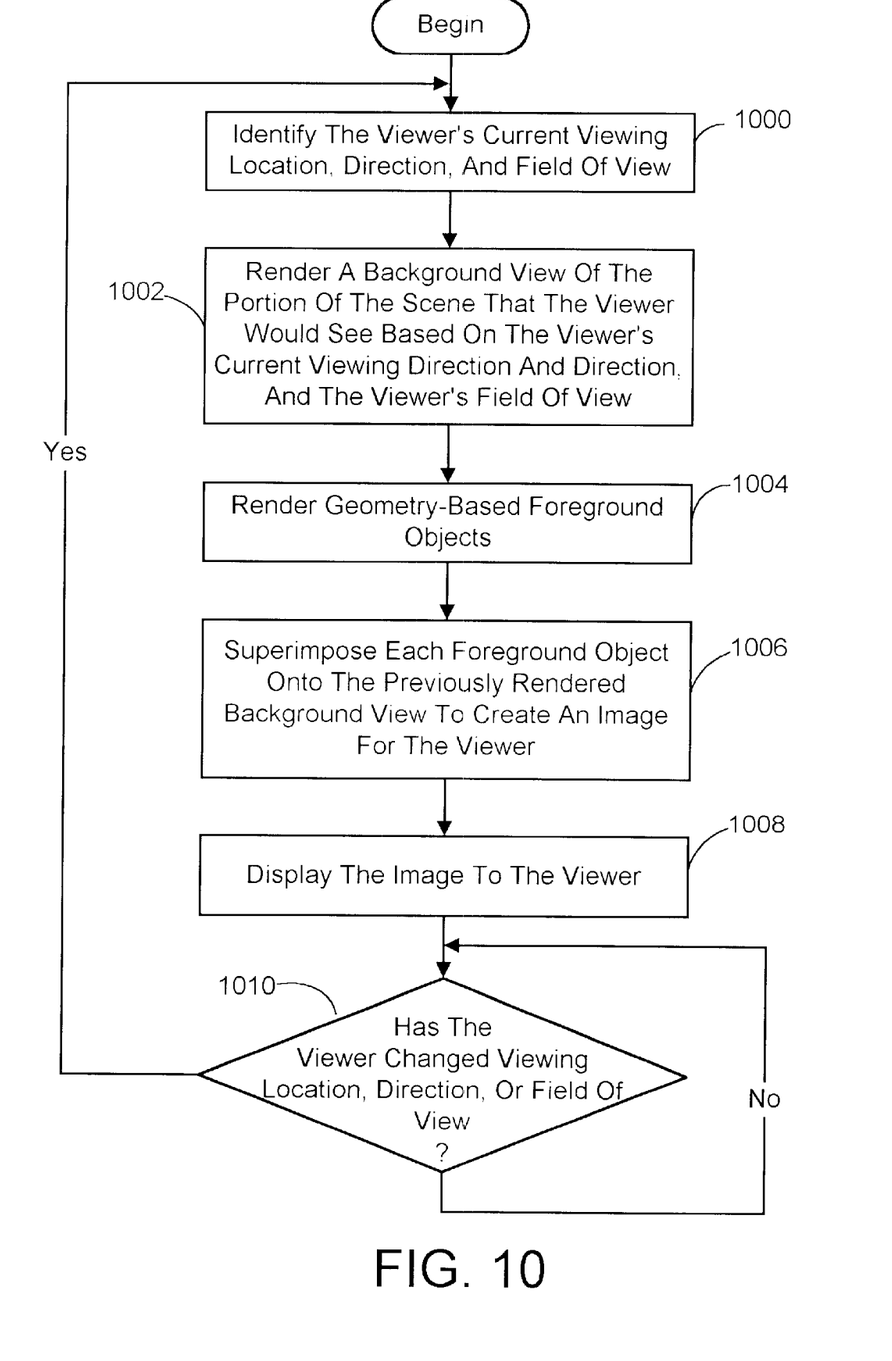
FIG. 10 is a flow chart diagramming a detailed process for rendering a virtual reality environment in accordance with the overall technique of FIG. 2.
Figure 11A:
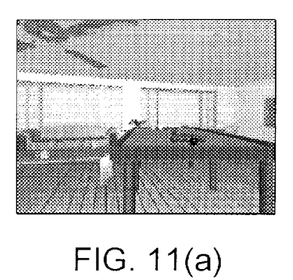
FIGS. 11(a) through 11(f) provide a series of images depicting a virtual reality environment which shows a 3D graphics pool table from various viewpoints within the virtual interaction space of the environment.
Figure 11B:
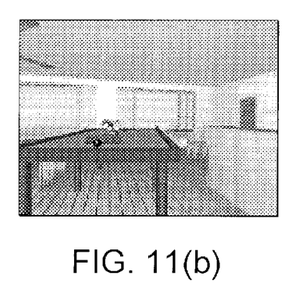
Figure 11C:
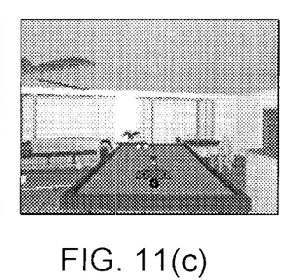
Figure 11D:
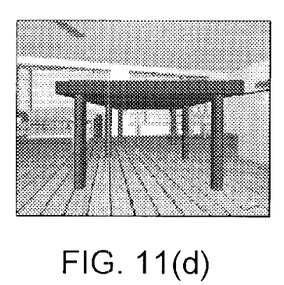
Figure 11E:
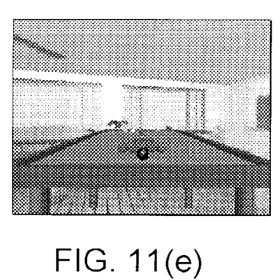
Figure 11F:
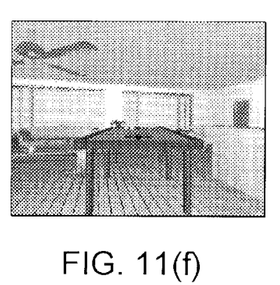

4.0 Combining The Image-Based Background And The 3D Graphics Objects Into An Image Displayable To The Viewer Having explained the rendering an image-based background and 3D graphics objects, it will now be described how they are combined to produce an image that is then displayed to the viewer. Generally, referring to FIG. 10, the viewer would select a desired viewpoint and viewing direction, as well as field of view, if it is not set by default, and the selected viewing parameters would be identified by the computing system implementing the present invention (process action 1000). These identified viewing parameters are then used by the image-based background rendering program to generate a photo-realistic view of the portion of the background scene that would be visible based on the specified viewing parameters (process action 1002). The 3D graphics engine then generates a view of the 3D graphics objects depicted as they would appear from the selected viewing parameters (process action 1004). The rendered view of the 3D graphic objects is then superimposed on the background (process action 1006) to produce an image for display to the viewer. Most 3D graphics engines are capable of doing this task. If this is the case, the background view would be supplied to the graphics engine from the background rendering module. Otherwise the two views can be combined using conventional methods for superimposing foreground elements onto a background view. After the combined image is generated, it is displayed to the viewer as indicated by process action 1008. The foregoing process (of actions 1000 through 1008) is then repeated each time the viewer changed viewing location, direction, or the field of view (i.e., zooming in or out), as indicated by process action 1010.

As for a viewer's interaction with the 3D graphic objects, this would be handled in the normal manner specific to the rendering engine employed. Thus, the present system and method is transparent to current 3D rendering systems and so can be widely implemented.

5.0 Experimental Results

As an example, a billiard game is developed with the use of our application programming interface. Since it is hard to design an array with dozens of cameras at present stage, we simulate the capture process in a synthetic scene. We choose the radius of the capture circle as 1.57 meters. Both of the longitudinal and lateral field of view of the camera are 45 degrees. Therefore, the radius of wandering circle is 0.6 meters. We specify 61 cameras in an array of 2.7 meters high. The specified height of the rotating arm that supports the camera array is chosen to be 1.55 meters. Each camera is specified as capturing 360 pictures with a resolution of 256×256 pixels in one rotation of the array. It takes about 30 hours to render the resulting 21960 images in a Pentium III 500 Pc. The amount of the resultant raw image data is about 4 GB. After vector quantization (12:1) and Lempel-Ziv coding (4:1), the size of the data file is reduced to 80 MB. As to the 3D graphic objects, we deploy a billiard table into the scene using the OpenGL 3D graphics engine. Viewers can navigate in the room or hit the billiard balls on the table. One important thing in deploying the table is that one must put the table on the ground, i.e., the level of the table leg bottoms must be equal to the level of the ground. It is easy to achieve this in our system since the height of the camera array has been already recorded. The viewer can arrange the table according to the recorded parameters. FIG. 11 shows the views of the billiard table and the room when the user move left (a) and right (b), up (c) and down (d), forward (e) and backward (f). One can see that lateral and longitudinal parallaxes obviously exist between the 3D graphic objects and other objects in the room. In addition, the legs of the table are really fixed on the ground without any shift. Therefore, our system successfully keeps the geometrical consistency of the 3D graphics objects and the surround scenes. It is noted that the billiard table is so large that it exceeds the range of the capture circle. As such, the portion of the table extending out of the virtual space is superimposed on the background scene so as to appear that it occupies the empty floor space just beyond the capture circle. Since the portion of the table extending out of the capture circle does not intersect any element of the background it looks natural to the viewer.

Figure 12A:
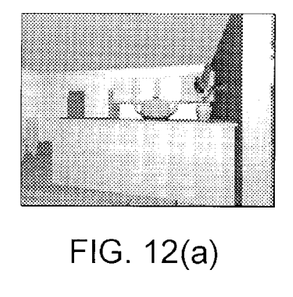
FIGS. 12(a) through 12(c) provide a series of images depicting a virtual reality environment which shows a 3D graphics teapot placed on a table in the background from various viewpoints within the virtual interaction space of the environment.
Figure 12B:
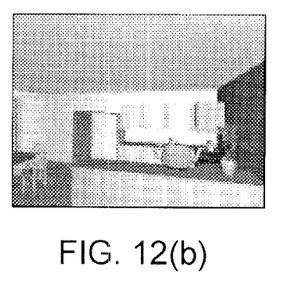
Figure 12C:
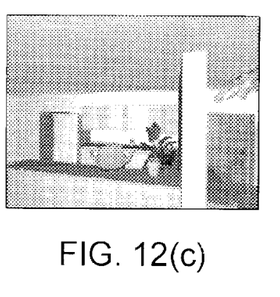

As discussed previously, we can also put 3D graphic objects on some objects in the captured scene. In FIG. 12(*a*), we put a teapot to the same high level of the table surface in the kitchen, and adjust its depth from another view as illustrated in FIG. 12(*b*). The position of the teapot is also consistent when it is viewed from other directions (FIG. 12 (c)).

6.0 References

[1] S. E. Chen, QuickTime VR—An Image-based Approach to Virtual Environment Navigation, Computer Graphics Proceedings, Annual Conference Series, pages 29–38, Proc. SIGGRAPH 1995 (Los Angeles), August 1995.

[2] C. -S. Chen, Y. -P. Hung, S. -W. Shih, C. -C. Hsieh, C. -Y. Tang, C. -G. Yu and Y. -C. Cheng. Integrating 3D graphic objects into real images for augmented reality. In Proceedings of the ACM symposium on Virtual reality software and technology, 1998, pages 1–8.

[3] Paul Debevec, Rendering Synthetic Objects Into Real Scenes: Bridging Traditional and Image-Based Graphics With Global Illumination and High Dynamic Range Photography, SIGGRAPH 1998.

[4] H. Y. Shum and L. W. He, Rendering with Concentric Mosaics, Computer Graphics Proceedings, Annual Conference Series, pages 299–306, Proc. SIGGRAPH 1999 (Los Angeles), August 1999.

[5] Y. Yu and J. Malik, Recovering Photometric Properties of Architectural Scenes from Photographs, ACM Computer Graphics, Proc. of SIGGRAPH 1996, pp.207–218, 1998.

[6] Y. Yu, P. Debevec, J. Malik and T. Hawkins, Inverse Global Illumination: Recovering Reflectance Models of Real Scenes from Photographs, ACM Computer Graphics, Proc. of SIGGRAPH 1999, pp.215–224, 1999.

Wherefore, what is claimed is:

1. A computer-implemented process for rendering a virtual reality environment, comprising using a computer to perform the following process actions:

inputting image data defining a 3D scene;

rendering an image-based background from the image data;

rendering one or more geometry-based foreground objects; and integrating each foreground object into the background.

2. The process of claim 1, wherein the process action of rendering the image-based background comprises an action of defining a virtual space in which the viewer can move by selecting at least one of (i) a viewing position, (ii) a viewing direction, and (iii) a field of view.

3. The process of claim 2, wherein the process action of rendering the image-based background further comprises an action of rendering a view of the portion of the 3D scene that the viewer would see based on the viewer's currently selected viewing position, direction, and field of view.

4. The process of claim 2, wherein the process action of rendering the geometry-based foreground objects comprise the action of rendering each object such that it is completely contained within the defined virtual space.

5. The process of claim 2, wherein the process actions of rendering the geometry-based foreground objects comprise the actions of:

rendering a first portion of an object such that it is contained within the virtual space; and rendering the remaining part of the object outside of the virtual space.

6. The process of claim 5, wherein the process action of rendering the remaining part of the object outside of the virtual space comprises rendering the remaining part such that it is contained within an empty portion of the background in that there are no background elements present in the area where the remaining part of the object is positioned.

7. The process of claim 2, wherein the process action of rendering the geometry-based foreground objects comprise an action of rendering an object such that it is located outside the defined virtual space.

8. The process of claim 7, wherein the process action of rendering the object such that it is located outside the defined virtual space comprises rendering the object such that it is located in an empty portion of the background in that there are no background elements present in the area where the object is positioned.

9. The process of claim 8, wherein the process action of rendering the object such that it is located outside the defined virtual space further comprises rendering the object in a location where once it is integrated into the background it appears to be touching an element depicted in the background.

10. The process of claim 1, wherein integrating each foreground object into the background comprises an action of superimposing each foreground object onto the previously rendered background to create a combined image.

11. The process of claim 1, further comprising the process action of displaying the combined image to a viewer.

12. A system for rendering a virtual reality environment, comprising:
   a general purpose computing device;
   a computer program comprising program modules executable by the computing device, wherein the computing device is directed by the program modules of the computer program to, (a) identify the viewer's current viewing location and direction;
   (b) render a background view of the portion of the scene that the viewer would see based on the viewer's current viewing position and direction, and the viewer's field of view;
   (c) render one or more geometry-based foreground objects, wherein each object is rendered as it would appear from the viewer's current viewing position, direction, and field of view;
   (d) superimpose each foreground object onto the previously rendered background view to create an image for the viewer;
   (e) display the image to the viewer; and
   (f) repeat program modules (a) through (e) each time the viewer changes viewing location, direction, or filed of view.

13. A computer-readable medium having computer-executable instructions for rendering a virtual reality environment, said computer-executable instructions comprising:
   inputting image data defining a 3D scene;
   having a viewer select a desired viewpoint, viewing direction, and field of view if it is not set by default;
   rendering from the image data a background view of a portion of the 3D scene that the viewer would see based on the viewer's currently selected viewing position, direction, and field of view;
   rendering the geometry-based foreground objects, wherein each object is rendered as it would appear from the viewer's current viewing position, direction, and field of view; and
   superimposing each foreground object onto the previously rendered background view to create an image for the viewer;
   displaying the image to the viewer.

14. The computer-readable medium of claim 13, wherein the instruction for rendering the background view comprises an action of defining a virtual space in which a background view can be rendered regardless of the viewpoint, viewing direction, and field of view selecting selected by the viewer, and wherein the viewer is constrained to select a viewing position, viewing direction, and field of view within the virtual space.

15. The computer-readable medium of claim 14, wherein the instruction of rendering the geometry-based foreground objects comprise an action of rendering each object such that it is at least partially located within the defined virtual space.

16. The computer-readable medium of claim 15, further comprising an instruction for allowing a viewer to interact with any portion of the foreground objects located within the defined virtual space.

* * * * *